Oct. 13, 1970   B. QUANQUIN   3,533,829
PROCESS AND APPARATUS FOR SOLIDIFYING AND GRANULATING A PASTE
Filed Dec. 8, 1966   2 Sheets-Sheet 1

INVENTOR
BERNARD QUANQUIN
BY
ATTORNEY

United States Patent Office 3,533,829
Patented Oct. 13, 1970

3,533,829
PROCESS AND APPARATUS FOR SOLIDIFYING AND GRANULATING A PASTE
Bernard Quanquin, Grand'Couronne, France, assignor to Azote et Produits Chimiques S.A., Toulouse, France
Filed Dec. 8, 1966, Ser. No. 600,209
Claims priority, application France, Dec. 14, 1965, 42,111; Oct. 14, 1966, 80,002
Int. Cl. B44d 1/48
U.S. Cl. 117—62.2    15 Claims

ABSTRACT OF THE DISCLOSURE

A process and apparatus for granulating paste wherein a fluidized bed of particulate cores is formed in a trough by an upwardly flowing gaseous current and continuously moved from a feed point to a discharge point while the paste to be granulated is sprayed downwardly on the bed to coat the cores and progressively increase the size of the resultant particles.

---

This invention relates to a method and apparatus for processing melts, solutions, or slurries to obtain a granulated solid product.

The invention, atlhough specifically described as related to granulating and solidifying fertilizer compounds in a fluid form by coating particularized material, is also applicable to any process in which the size of particles must be increased. Furthermore, this invention is applicable to the processing of any liquid-like substance which can be hardened or cured by exposure to air or other gases, either in the form of a true liquid or in the form of a substance sufficiently fluid to be divided into fine droplets by spraying. The method is particularly applicable to fertilizers obtained as a melt, such, for example, as urea or to an aqueous concentrated solution such, for example, as ammonium nitrate solutions, or to slurries, such, for example, as the various pastes obtained during the manufacture of complex fertilizers by the nitrosulfuric, nitrophosphoric, or nitrocarbonic processes. As used herein, the word "paste" is intended to include, regardless of the physical form, any substance to be granulated whether melt, solution or slurry.

In the prior art, there are several methods of solidifying and granulating liquids or pastes. As an example, paste is atomized into fine droplets and directed onto small, moving solid particles to thereby coat their surfaces with a thin layer. The layer is then hardened, when treating a solution or a slurry, with hot air or gases or, when treating a melt, with a cold air stream. As used hereinafter, the term "hardening gaseous stream" will be used generically to designate any treating gas.

Small particles, hereinafter designated as "cores," are generally obtained by recycling a portion of the output of a granulating apparatus. The output product is classified according to size, by sifting the product to segregate and classify the output into the following categories: large-size particles, designated hereinafter as "coarse particles"; particles within the desired range of size designated as "marketable particles or product" and fine particles, hereinafter designated as "fines." After the classifying operation, the marketable product is withdrawn from the output product and the fines are returned for recycling. The coarse particles are crushed and optionally recycled, thus providing an additional quantity of fines which are added to the classified fines for recycling.

In the prior art, one of the above-described techniques for growing granules by the deposition of successive coating layers on cores is performed by spraying liquid onto fines disposed on a rotating structure such as either an inclined, rotating pan or a rotary drum. While the fines are agitated or maintained in a state of continuous motion by the rotating structure, the paste is atomized and deposited thereon and, simultaneously, is hardened by a gaseous stream directed onto the coated fines or cores.

The above-described process has the disadvantage that, due to the nature of the agitating equipment employed, uniform distribution of paste on the cores is prevented. When a rotating surface is used to impart movement to the cores, the speed and path of the cores cannot be accurately controlled and the cores are therefore distributed unevenly in front of the jets projected by the spraying device. For this reason, a portion of the cores is coated with layers of varying thickness thus producing cores grown beyond the desired size, while other cores receive little or no coating, thereby resulting in the production of undersized granules. Under these conditions, the prior art apparatus produces a large proportion of fines and coarse particles which must be recycled, therefore reducing the output of marketable product and increasing the recycle ratio, i.e., the ratio of the weight of recycled fines to marketable product. The size of the granulating, handling, screening and crushing equipment required for a given output rate increases with the increase of the recycle ratio, thereby increasing electric power, maintenance, and other operating costs.

Another drawback to the above-described prior art equipment is that the cores, set into motion by the rotating surfaces, are in almost constant contact with one another or with the rotating surface during or after the coating step. The freshly coated cores tend to agglomerate or stick together to form coarse particles and also adhere to and build up on the rotating surface, thereby forming hard deposits which impair the operation of the apparatus.

The problems of the above-described prior art practice have been somewhat overcome by another method, known generically as the spouted bed process. In this process, a gaseous flow stream is projected through a bed if priming granules or cores to thereby maintain the bed in suspension and continuous circulation. The paste is also projected upwardly with the gaseous flow to coat the cores during fluid suspension thereof. The prior art spouted bed process improves the distribution of paste on the cores over that of the rotating surface process, thereby somewhat reducing the resultant recycle ratio. The prior art spouted bed process has, however, a large power requirement, since suitable power must be furnished to maintain the cores in suspension, thus increasing the operating costs. Due to the nature of the prior art apparatus, the spouted beds have generally been limited in capacity and therefore find little use in high production capacity plants.

In another prior art process the paste to be granulated is atomized onto a fluidized bed of priming granules or cores, contained in a vertical cylindrical tower. The bed is maintained in a fluidized state by a hardening gaseous stream projected upwardly through a permeable supporting screen member or grid. When the gaseous flow stream is projected at the proper rate, depending within narrow limits on the density and size of the particles to be suspended, the bed as a whole has the appearance of a boiling liquid having a well defined upper surface. When supported by the gaseous stream, each of the solid particles is caused to rotate or oscillate and the contact between particles is rather casual and random. For this reason, it would appear advantageous to utilize the fluidized bed principle to apply paste in successive layers to priming granules or cores, since the probability of the formation of agglomerates is decreased. Attempts have been made in the prior art to profitably utilize the fluidized bed principle to form granulated solids from liquid, however it has heretofore been impossible to effectively utilize this process for high production facilities because of the extreme cost involved in treating large quantities of products in a batch process. Prior art drawbacks have made it practically impossible to operate such a process in a continuous fashion.

One of the primary problems of the fluidized bed principle has been in the area of bed stabilization since the bed is generally made up of particles having a large variation in size. In a fluidized bed, the particles tend to classify themselves according to their size, the fines moving toward the upper surface of the bed and the coarse particles gravitating to the lower area of the bed near the grid. The coarse particles localize increasingly in certain areas of the grid, thereby increasing the resistance to gaseous flow at these points and decreasing the flow of the gaseous stream thereat to the point that the flow may become too small to maintain the bed in suspension. This phenomenon thereby causes partial defluidization of the bed at the points of concentration of coarse particles on the grid and, since the total rate of the gas does not vary to any great degree, the velocity of the gaseous stream is increased in the sections of the grid which are free from the unfluidized coarse particles. This increased flow causes the bed in the remaining area to gradually become more dispersed, eventually stretching upwardly and spreading, thereby uncovering portions of the grid through which the fluidizing gas, finding less resistance, preferentially flows. Such defluidization results in great losses of time since it is impossible to restore the fluidized state of the bed without shutting down the apparatus and mechanically redistributing the bed of particles.

Another problem encountered in the prior are fluidized bed devices, and particularly involved in the inherent difficulty of attaining the continuous processing required in high production facilities, relates to the step of discharging particles after treatment. In the aforedescribed vertical cylindrical apparatus, the particles may be discharged either from the upper portion of the bed by overflowing the bed over the top of the apparatus or from the lower portion of the bed by bleeding off the lowermost particles. In the first instance, since the particles classify themselves in the fluidized bed as was described above, those discharged by overflow are necessarily the finer particles stratified near the upper surface of the bed, thereby increasing the recycle ratio by increasing the ratio of fines to marketable product. Furthermore, as the proportion of coarse particles in the bed increases due to the continual overflow of finer particles, the tendency of the bed to defluidize is increased. From the above it would seem more advantageous to discharge the particles from the lower portion of the apparatus by bleed-off so that a product having a higher content in marketable product and lower content in fine particles may be obtained. Such withdrawal is, however, very difficult to achieve since the height of the lower surface of the bed is not self-regulating, as in the case of overflow discharge, and precise height regulating means would therefore be necessary so that the discharge may be continually adjusted to compensate for inevitable variation of the feed rate of cores and paste. In addition, in practice the above apparatus is often clogged due to the concentration of coarse particles and the formation of agglomerates in the area of withdrawal or discharge, which concentration causes the upper level of the bed to vary and the proportion of the coarse particles to fine particles to increase thereby increasing the likelihood of defluidization.

The present invention relates to a process and apparatus for granulating a paste which involves maintaining a bed of priming granules or cores in a fluidized state by introducing a paste hardening gaseous stream therein and simultaneously spraying a paste onto the fluidized bed in such a manner as to allow continuous operation without the risk of defluidization and with an improved rate of yield of marketable products.

In accordance with the present invention, a thin bed of cores of elongated shape is maintained in a fluidized state above a support by injection of a hardening gaseous flow-stream. The fluidized bed is coated with the paste to be granulated to form particles or granules of the required size. The cores are fed in at one end of the bed, are fluidized, translated longitudinally, and then discharged at the opposite end of the bed. The paste to be granulated is sprayed at at least one point above the bed intermediate the feed and discharge ends thereof.

By utilizing the teachings of this invention, it has been found that the paste to be granulated can be sprayed onto a relatively thin fluidized bed of cores without clogging or caking the bed support. It has also been found preferable to maintain beds of thickness between 5 and 20 centimeters since clogging or caking of the bed support generally occurs with beds below this thickness while beds of greater thickness do not present any particular advantage over the thinner beds but require a higher gas pressure, and therefore, useless consumption of energy in order to maintain fluidization. In industrial practice, fluidized beds between 8 and 10 centimeters in thickness are preferred.

Translation or lateral movement of the fluidized bed may be accomplished by any suitable means known in the art. As an example, the support of the fluidized bed may be provided with a slope with respect to the horizontal so that the bed will flow by gravity as a fluid towards the lower end thereof. The speed of movement of the bed may be regulated, according to the nature of the product to be treated and the average size of the particles in the bed, by proper selection of the bed slope. Although the bed may be disposed at any slope suitable for the particular process, it has been found that slight slopes provide sufficient bed movement for most of the contemplated uses of this invention. As an example, in the treatment of a fertilizer of the nitrophosphoric type having a particle size ranging between 1 and 5 mm., a slope of 15° to 30° has been found to be suitable.

Another method of achieving fluidized bed movement is by means of vibrating the bed support. In this method, the support is vibrated in both a vertical and horizontal direction magnetically or mechanically by any suitable means such, for example, as by a rotary eccentric or the like. In this case, the rate of movement of the bed may be controlled by variation of the amplitude and/or frequency of the vibrating means.

It should be understood that, in certain instances, movement of the fluidized bed may be achieved by a combination of the above-described methods, that is, by vibratory movement of a sloped support.

Regardless of the method of translation used, the movement of the bed is substantially regular and controllable as required. This provides a particular advantage over the prior art processes since it has heretofore been practically impossible to regulate the velocity of the cores in the spray zone. The process of the present invention enables control of the thickness of the coatings on the cores and, therefore, allows the control of the growth of the granules.

A further advantage observed in the practice of this invention is the complete avoidance of periodical defluidization of the bed. Overgrown cores which fall back on the support do not gather thereon but, under the influence of the slope and/or the vibratory movement of the support, progress continuously towards the discharge end of the bed support. Localized reduction of the supporting gas flow is thereby precluded and defluidization is avoided.

Another advantage of this invention is that the movement of the fluidized bed from input to discharge end provides a logical and secure discharge of particles which is not the case in fixed fluidized beds. Upon reaching the discharge end of the support, the granules formed drop under the influence of gravity as will become more apparent by reference to the following detailed description of the equipment.

Vibration of the fluidized bed support provides, in itself, a further advantage in that the vibration notably improves the stability of the bed and provides a more uniform level of the upper surface through a more homogeneous distribution of the particles throughout the bed.

Since the fluidized bed is elongated in shape, a plurality of sprayers may be disposed above it. The space between sprayers should be sufficient to allow the layer of paste deposited on the cores by the preceding sprayer to harden prior to the cores reaching the succeeding spray zone. The use of several successive sprays is advantageous in that the cores receive several thin layers of paste instead of one or more thicker layers, thereby improving the contact between the paste coatings and the hardening gas and improving the thermal efficiency of heat exchange for the drying process. Furthermore, during the passage of the cores between spray zones, the relative positions thereof are changed due to the motion of the cores in the fluidized bed, thereby insuring more equal distribution of paste throughout the cores in the bed and/or varying the angle of incidence of the spray on the individual cores. The distribution of the paste on the cores is thereby improved and the particle size of the resultant product is more uniform. Since the size of the granules grows from the end of the fluidized bed to which the cores are fed to the discharge end and since the cores move through one or more spray zones wherein they are coated with layers of paste and are thereby built up or "grown" by successive coatings, the growth of the granules can be regulated by controlling two factors, e.g., the speed of translation of the fluidized bed and the number of spray zones.

It should be understood that, within the limits of the present invention, it is also possible to obtain a chemical reaction between the hardening gaseous stream and the layers of paste coating the fluidized cores by replacing the hardening gas with a gas capable of reacting with the paste. Because of the large surface area presented by the thin layers of paste sprayed onto the cores and due to the widespread distribution of the gaseous reagent over the fluidized particles, chemical reactions occur quickly and homogenously. In the fertilizer industry, for example, this invention is particularly advantageous since a gas containing ammonia may be used as or with the hardening gas for neutralizing acid pastes such as those obtained by the action of nitric acid optionally mixed with sulfuric and/or phosphoric acid, or by aqueous solutions of phosphoric, nitric or sulfuric acids, on phosphate rock. As another example of a reaction which may be achieved during processing in accordance with the invention, the calcium nitrate in ammoniated pastes produced during the manufacture of complex fertlizers by the nitrocarbonic process may be converted by use of a hardening gas containing carbon dioxide. It is also possible to utilize the hardening gas to achieve various chemical reactions such, for example, as simultaneous ammoniation and carbonation of pastes during the manufacture of complex fertilizers by the nitrocarbonic process.

It is, therefore, an object of this invention to furnish a novel process for producing a granulated solid from liquids including melts, solutions or slurries in an economical, continuous manner by continuously coating cores maintained in a moving fluidized bed with the liquid.

It is another object of this invention to provide an apparatus for producing granulated solids from melts, solutions or slurries in a more efficient manner than heretofore possible by minimizing the recycle ratio of the output product of the apparatus.

It is still another object of this invention to furnish a method and apparatus for producing granulated solids from melts, solutions or slurries which overcomes the disadvantages of the prior art by spraying the upper surface of a moving fluidized bed to coat granules maintained in the bed with a paste including the melt, solution or slurry.

These and other objects of the invention will become better understood by reference to the following detailed description when viewed in light of the accompanying drawings, wherein like components throughout the figures thereof are indicated by like numerals and wherein.

According to this embodiment of the invention, a bed of cores is maintained in a fluidized state above a permeable support or grid by an ascending hardening gaseous flow stream and the paste to be granulated is sprayed thereon to individually coat the cores. The use of an ascending gaseous flow stream as a means for fluidizing pulverulent solids is well known in the process industry and is described in patents such as U.S. 2,995,773 to Gidlow et al., issued Aug. 15, 1961.

Figure 1:
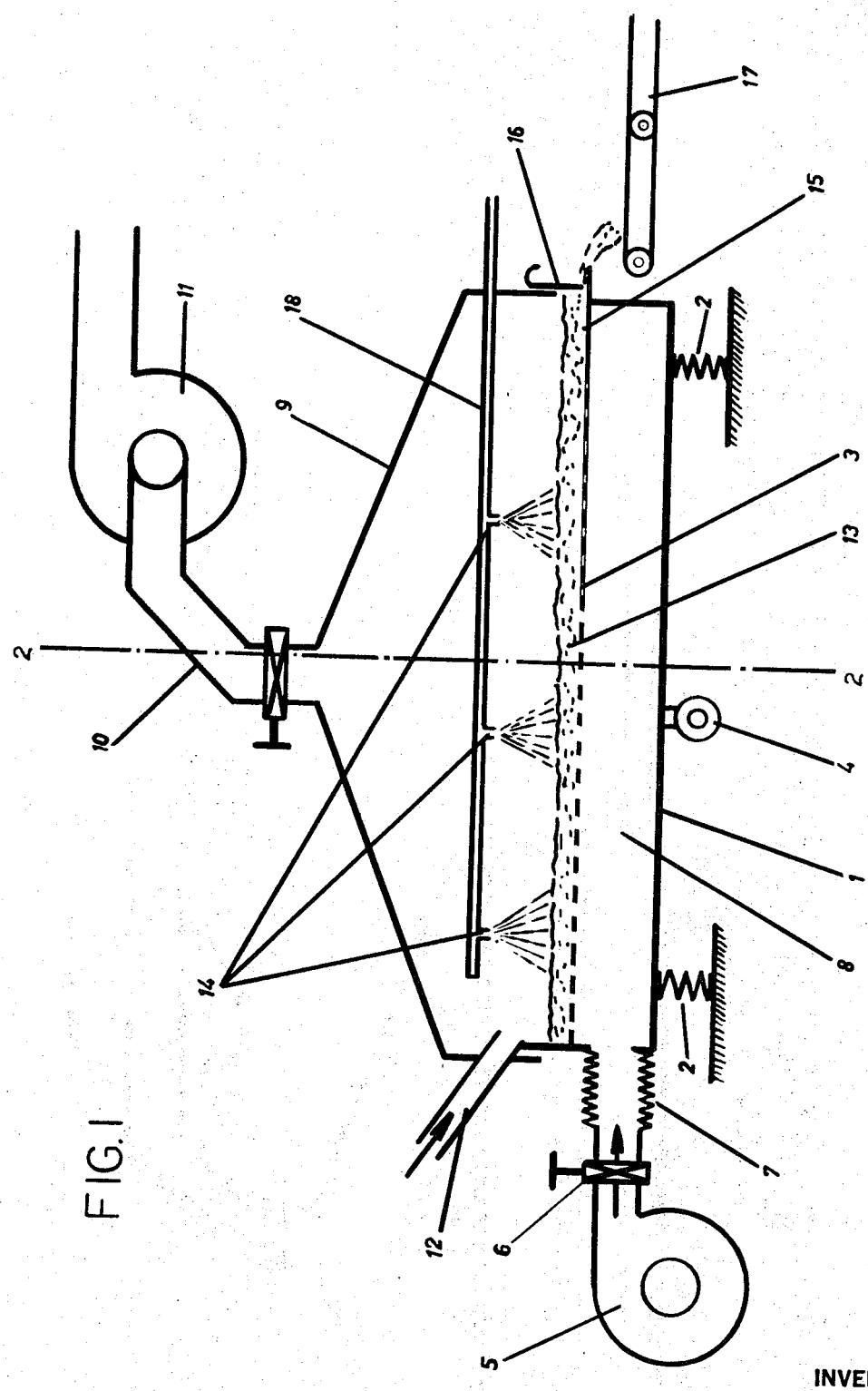
FIG. 1 is an elevational schematic view of an apparatus in accordance with this invention.
Figure 2:
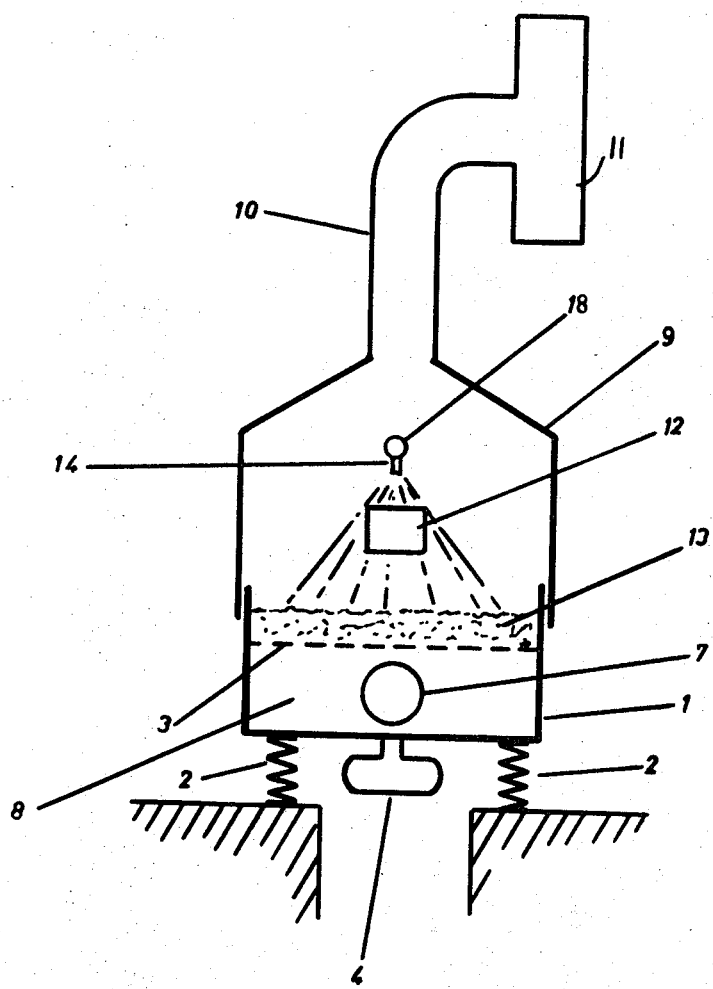
FIG. 2 is a schematic sectional view of the apparatus of FIG. 1 taken along the lines 2—2 thereof.

The apparatus, as schematically illustrated in FIGS. 1 and 2, comprises a metal trough 1 having a rectangular planiform configuration, the length being, for example, on the order of 5 to 20 times the width thereof. The trough 1 is resiliently supported by springs 2 and is provided with a pervious grid 3 disposed parallel to and spaced above the bottom of the trough and formed in any suitable manner such, for example, as by intersecting bars or by a perforated plate. The size range of the perforations or of the openings between intersecting bars of the support or grid is such that the granules of the bed cannot pass through the support or grid. A vibrator 4, which simultaneously produces longitudinal and vertical impulses, is fixed to the bottom of the trough 1 and is preferably arranged so that the amplitude and the direction of the impulses may be varied as desired.

The exhaust of a blower 5 is communicative, through a regulating valve 6 and an elastic joint 7, with a space 8 between the grid 3 and the bottom of the trough 1. The blower may also, as desired, be communicative, on the input side thereof, with the atmosphere, a source of hardening gas or a source of gaseous material which will react with the material to be treated according to the desired treatment as was discussed above.

A hood 9, disposed above the trough 1, has depending edges disposed to overlap, in spaced relation, upstanding edges of the trough 1. The hood communicates through a duct 10, with an exhaust fan 11 which, in turn, communicates with the atmosphere. Dust cleaners (not shown), of any type known in the art, may be interposed between the exhaust fan and the atmosphere if so desired. Elastic joints (not shown) may also be provided between the depending edges of the hood 9 and the upstanding edges of the trough 1. The joints thereby furnish a seal between the elements while avoiding transmission of vibrations from the trough so that the supports for the hood 9 may be independent of the vibrating portion of the mechanism.

A core supply or inlet 12, communicative at one end with a source of cores (not shown) and at the other end with the interior of the trough above the grid 3, is disposed through a depending edge of the hood 9 and terminates above one end of the trough. Cores feed through the core inlet 12 form a bed 13 on the grid 3. A plurality of sprayers 14, communicative with the source of paste (not shown), are disposed above the surface of the bed 13 in longitudinally spaced relationship to one another. An impervious plate 15 is disposed, in coplanar abutting relationship to the grid 3 at the end thereof opposite the core inlet. A vertically movable damper plate 16 is slidably mounted above the plate 15 on a depending wall of the hood 9. An endless conveyor 17 is disposed beneath the outer edge of the plate 15 to convey the output product discharged from the apparatus.

The sprayers 14 are preferably slidably affixed to a support 18 in a single row along the center line of the trough 1. These sprayers may obviously be disposed in two or more rows if the width of the trough so requires. The distance between the upper surface of the bed 13 and the sprayers 14 is dependent upon the cone angle of the material sprayer from the sprayers since the spray area must cover substantially the entire width of the bed 13 but must not be such that the upstanding walls of the trough 1 are coated thereby, since a continually increasing deposit on the walls would result. By slidably mounting the sprayers 13 on the support 18, and by feeding the sprayers through flexible supply hoses (not shown), the operator may vary the position of the sprayers 14 according to the nature of the particular paste to be processed. The optimum space between sprayers for each particular case may be determined by experiment. The spray velocity and size of the spray droplets must be sufficient to insure that the spray reaches the bed 13 but does not substantially disturb its upper surface.

If more than one chemical reaction utilizing different gaseous reagents is to be performed on the paste, the space 8 between the bottom of the trough 1 and the grid 3 may be longitudinally divided by partitions to provide the required number of compartments so that different gaseous reagents may be separately fed to these compartments.

In operation, the vibrator 4 is energized and longitudinal and vertical movement is imparted to the trough 1. The amplitude and the direction of the vibrations are adjusted so that the movement imparted to the bed of cores 13 is at a suitable rate as determined by the nature of the particles or cores making up the bed. The blower 5 is then energized to force the hardening gaseous flow into the space 8 and through the perforations or openings in the grid 3 to fluidize the bed 13. The pressure and velocity of the hardening gaseous flow stream from the blower 5 should be such that the bed of cores 13 is properly maintained in a fluidized state. Although this pressure will vary according to the thickness of the bed of cores to be treated, with a bed of approximately 10 centimeters in thickness, for example, the gas pressure should be in the range of 50 to 70 mm. of water lift. The hardening gaseous flow, passing through the grid 3 and the bed 13, is collected in the hood 9 and exhausted through the duct 10 and the exaust fan 11. Cores are supplied to the inlet end of the trough 1 through the core inlet 12 in sufficient volume to maintain a desired height in the fluidized bed 13. Under the influence of the vibrations imparted by the vibrator 4, the fluidized bed is continuously moved from the inlet end of the trough 10 toward the imperforate plate 15 at which point the fluidization of the bed is terminated due to the absence of the flow of hardening gas therethrough. The height of the damper plate 16 is adjusted so that the height of the bed 13, as a function of the rate of input of the cores through the core inlet 12, is at the desired level so that the discharge of cores from the apparatus takes place from the lower and middle part of the bed 13.

As can readily be seen, the cores are maintained in a fluidized state and in continual movement so that coatings of paste from the sprayers 14 are widely distributed over the surfaces thereof as was described above. Furthermore, as was also pointed out above, in a fluidized bed the heavier or larger particles tend to segregate themselves in the area of the grid or lower surface of the bed. By coating the particles from points above the bed, uniform coating is provided since, as the particles grow due to the coating action of the paste, they will tend to gravitate or segregate themselves toward the lower portion of the bed away from the spray sources. Simultaneously the fines or smaller particles will be forced toward the surface of the bed and thereby be presented for coating. As the fines pushed to the surface become coated and grow, they will, in turn, return toward the lower portion of the bed when of sufficient size, and a continuous circulation of growing granules results. This invention thereby provides more consistency in the thickness of coating of the granulated product than was heretofore available in the prior art.

The discharged cores from the bed 13 fall, under the influence of gravity, onto the conveyor 17 for transportation to a classifying apparatus and, as necessary, are recycled to the apparatus as was described above.

As was indicated above, movement of the bed of cores 3 may be achieved by means other than the vibrator described such, for example, as by inclining the slope of the grid 3 so that the bed flows by gravity from one end of the trough 1 toward the other. The inclined grid may also be combined with a vibrator means such as that described above if so desired.

In addition to the specifically described fluidizing means, alternate means of fluidization may be utilized if so desired. For example, a descending gaseous flow may be used to achieve fluidization of the core bed. In this instance, an impervious plate is used instead of the grid 3 and the bed of particles 13 is maintained in a fluidized state by means of a descending hardening gaseous flow stream injected through the bed and reflected from the plate. Apparatus for producing fluidized beds in this manner are known in the art and are described in patents such as U.S. 3,262,217 and 3,263,339 to Brown et al. In this type of apparatus, downward jets of hardening gas are projected through the bed of cores so that they are reflected upwardly by the impervious plate. The jets of gas must have a velocity sufficient to lift the cores, after reflection on the plate, and maintain the bed in a fluidized state. The hardening gas is removed from the apparatus bed in much the same manner as described for the embodiments set forth above. The paste is sprayed onto this fluidized bed of cores by sprayers in the same manner as in the embodiment set forth above.

Quantitatively, as an example of a process in accordance with the invention, a fertilizer paste may be prepared by continuously attacking 170 kg. per hour of phosphate rock containing 33.6% $P_2O_5$ with 520 kg. per hour of nitric acid containing 60% $HNO_3$ and 173 kg. per hour of phosphoric acid containing 55% $P_2O_5$. The reaction mass is ammoniated with 102 kg. per hour of ammonia and 253 kg. per hour of potassium chloride containing 60% $K_2O$. As a product of the above process, 1210 kg. per hour of fertilizer paste containing 20% water is produced. The resultant paste is then sprayed onto a bed of recycled cores in the above described apparatus arranged so that the trough is elastically supported at an angle of 16° relative to the horizontal. The apparatus is provided with a grid 0.60 meter wide and 3.00 meters in length. The cores are maintained in a fluidized state by hot air supplied at a rate of 7000 kg. per hour and at an inlet temperature of 350° C. The paste is sprayed onto the fluidized bed at a pressure of 4 kg./cm.² through three sprayers disposed in such a way that the sprayer head opens 35 cm. above the upper surface of the bed and respectively at .60, 1.20 and 1.80 meters from the core inlet 12. The outlet temperature of the fluidizing-hardening air is 100° C. through the duct 10.

After screening and classification, the output of the apparatus operated under the above-described conditions is one ton per hour of marketable product with a particle size ranging from 2 to 4 mm. Although particle sizes within the range set forth above are preferred for fertilizers, it should be understood that for other applications of this invention the particle growth may be regulated to produce a product of any desired size. Such control may be achieved by selection of the number of spray zones, the length of the trough, the velocity of movement of the bed and the size of the cores initially fed into the apparatus.

The preceding example can be repeated with similar success by substituting the generically and specifically described reactants and operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. An apparatus suitable for solidifying and granulating a paste comprising:
   an elongated trough having a bottom wall;
   a source of solid particulate cores communicative with one end of said trough to form a bed of cores therein;
   means for directing a treating gas upwardly to maintain in a fluidized state the bed of cores throughout the length of said trough;
   means to impart longitudinal translating movement to the bed of cores through said trough;
   discharge means spaced from said one end of said trough; and
   spraying means disposed above said trough to distribute paste to be solidified and granulated substantially normal to the upper surface of the bed during movement thereof through said trough to coat said cores therewith, said treating gas at least solidifying the paste coating on said cores, said spraying means being disposed in a plurality of zones between said one end of staid trough and said discharge means.

2. An apparatus in accordance with claim 1 wherein said means for directing a treating gas to fluidize the bed of cores comprises: a core bed supporting previous grid disposed in said trough in spaced relationship to the bottom thereof, and means including a gas pump to supply said treating gas to the space between said grid and the bottom wall of said trough under sufficient pressure to maintain the bed of cores in a fluidized state.

3. An apparatus in accordance with claim 1 wherein said means to impart movement to the bed comprises a vibrator associated with said trough to impart longitudinal and vertical vibrations thereto.

4. Process suitable for solidifying and granulating a hardenable paste comprising the steps of:
   forming a bed of particulate cores;
   fluidizing said bed above a support with an upwardly directed gaseous flow;
   continuously moving the fluidized cores longitudinally between a feed point and a discharge point;
   spraying a hardenable paste downwardly on the moving fluidized cores from above at a plurality of zones between said feed point and said discharge point to form a coating on said cores therewith;
   hardening said coating; and
   withdrawing said coated cores when the desired size thereof has been achieved.

5. A process as defined by claim 4, said bed being of a thickness between 5 and 20 centimeters.

6. A process in accordance with claim 4 wherein said paste is sprayed on said bed at at least one point along the path movement thereof under a pressure sufficient for even distribution thereof across the surface of the bed but not sufficient to substantially disturb the upper surface of the bed.

7. Process in accordance with claim 4 wherein the movement of the bed is accomplished by giving to the support a slope with respect to the horizontal.

8. Process in accordance with claim 4 wherein the movement of the bed is accomplished by vibrating the support in both a vertical and a horizontal direction.

9. Process in accordance with claim 4 wherein movement of the bed is accomplished by giving a slope to the support and vibrating said support.

10. The process in accordance with claim 4 wherein withdrawn granules below the predetermined size are recycled through said bed for additional coating thereof.

11. A process in accordance with claim 4 wherein withdrawn granules larger than a predetermined size are pulverized and recycled through said bed for recoating thereof.

12. A process in accordance with claim 4 wherein paste is sprayed onto said bed at a plurality of points spaced along the path of movement thereof.

13. A process in accordance with claim 4 wherein said bed is fluidized with a gas capable of chemically reacting with said paste.

14. A process in accordance with claim 4 wherein said bed is fluidized by an ascending gaseous flow stream propelled through a permeable bed support.

15. A process in accordance with claim 4 wherein said cores contain solid mineral salts of phosphate, nitrogen and potassium and wherein said paste contains an aqueous solution of mineral salts of phosphate, nitrogen and potassium.

References Cited
UNITED STATES PATENTS

| | | | |
|---|---|---|---|
| 2,094,786 | 10/1937 | Flint | 117—100 X |
| 2,420,368 | 5/1947 | Giordano | 118—303 |
| 2,464,294 | 3/1949 | Cortese | 118—62 X |
| 2,498,405 | 2/1950 | Fader | 117—100 X |
| 2,544,752 | 3/1951 | Gelbman | 117—100 X |
| 2,563,475 | 8/1951 | Mahoney | 118—62 X |
| 2,799,241 | 7/1957 | Wurster | 117—100 X |
| 2,833,241 | 5/1958 | Crowley et al. | 118—62 |
| 2,979,421 | 4/1961 | Rissman et al. | 117—100 |
| 2,995,773 | 8/1961 | Gidlow et al. | 117—100 X |
| 3,012,900 | 12/1961 | Kleinmann et al. | 117—100 X |
| 3,117,020 | 1/1964 | Fabris et al. | 117—100 |
| 3,161,483 | 12/1964 | Morris | 118—303 X |
| 2,600,253 | 6/1952 | Lutz | 23—259.1 |
| 2,837,415 | 6/1958 | Seymour | 71—39 |
| 3,376,124 | 4/1968 | Hollingsworth | 71—37 |

WILLIAM D. MARTIN, Primary Examiner

M. R. P. PERRONE, Jr., Assistant Examiner

U.S. Cl. X.R.

23—259.1, 284; 71—28, 34, 64; 117—62, 100; 118—303